United States Patent [19]

Bronsky et al.

[11] 4,437,347

[45] Mar. 20, 1984

[54] SHUT-OFF ACTUATING DEVICE

[75] Inventors: Robert J. Bronsky, New Baltimore; Dennis B. Clark, Flat Rock; Jeffrey A. McKeen, Detroit; William A. Przybylski, Dearborn, all of Mich.

[73] Assignee: Michigan Consolidated Gas Company, Detroit, Mich.

[21] Appl. No.: 340,377

[22] Filed: Jan. 18, 1982

[51] Int. Cl.³ .......................................... G01F 15/00
[52] U.S. Cl. .................................. 73/272 R; 73/198
[58] Field of Search ...................... 73/266, 267, 272 R, 73/198; 292/144

[56] References Cited

U.S. PATENT DOCUMENTS

| 1,720,706 | 7/1929 | Winton . |
| 2,297,528 | 9/1942 | Bell . |
| 2,746,745 | 5/1956 | Damon . |
| 3,039,290 | 6/1962 | Johnstone . |
| 3,724,270 | 4/1973 | Elder . |
| 3,795,417 | 5/1974 | Cohen . |
| 3,901,057 | 8/1975 | Coley . |
| 4,014,212 | 3/1977 | Douglas . |
| 4,102,164 | 7/1978 | Barbank . |
| 4,167,104 | 9/1979 | Bond . |

Primary Examiner—Herbert Goldstein
Attorney, Agent, or Firm—Harness, Dickey & Pierce

[57] ABSTRACT

A shut-off actuating device includes a stop member biased toward a position where it interferes with the movement of a linkage apparatus of a fluid flow measuring device. The fluid flow measuring device is adapted such that once the linkage apparatus is disabled or rendered inoperative, fluid flow through said device is thereby prevented. A solenoid-operated apparatus is provided which includes a solenoid rod or arm that normally engages the stop member to hold it in a retracted position out of said interference with the linkage apparatus. Once the solenoid apparatus is energized, the solenoid rod is disengaged from the stop member and the stop member is thus allowed to extend into an interfering relationship with the linkage apparatus, thereby disabling said apparatus or rendering it inoperative in order to shut off the flow of fluid through the fluid flow measuring device.

23 Claims, 3 Drawing Figures

SHUT-OFF ACTUATING DEVICE

BACKGROUND OF THE INVENTION

The invention relates to shut-off actuating devices for fluid supply systems, and more particularly to such shut-off actuating devices operatively connected to fluid flow measuring devices, or fluid flow meters.

In fluid supply systems, such as those commonly used by a public utility for providing gaseous or liquid fuels, or other fluid commodities, to its customers, it is often desirable to terminate such fluid supply under various conditions. For example, if a customer has discontinued paying his utility bills for a substantial period of time, it is desirable to have a means by which that customer's service may be conveniently and rapidly terminated without the necessity of entering into the structures on the premises being served. No such convenient or rapidly-actuatable termination means has previously been available.

One of the objects of the invention, therefore, is to provide a simple, inexpensive apparatus for conveniently and rapidly shutting off a fluid supply system where conditions dictate that the supply of such fluid be terminated. Another of the objects of the invention is to provide such a shut-off actuation device or apparatus which may be operated remotely with portable energizing means without having access to the fluid flow measuring device of such supply system. Still another of the objects of the invention is to provide such a shut-off actuating device which may be easily reset and reused when such fluid supply is re-established. These and other objects of the invention will become apparent from the following discussion and the drawings in connection therewith.

SUMMARY OF THE INVENTION

A shut-off actuating device according to the invention is adapted for use with a fluid flow measuring device having linkage apparatus adapted to prevent fluid flow through said device when said linkage apparatus is disabled or otherwise rendered inoperative. The shut-off actuating device preferably includes a stop member biased toward engagement or interference with the linkage apparatus in order to disable the linkage apparatus or render it inoperative. The shut-off actuating device also preferably includes an actuation mechanism or apparatus having an actuating member adapted to engage the stop member to hold it out of said engagement or interference with the linkage apparatus. The actuating member is selectively moveable into and out of said engagement with the stop member so that the stop member may be allowed to move into disabling engagement with the linkage apparatus. The actuating member is preferably urged out of engagement with the stop member by a solenoid device which may be energized or activated at the fluid flow measuring device or from a remote location by means of a portable, hand-held power source, if desired.

DETAILED DESCRIPTION OF THE PREFERRED EMBODIMENTS

Figure 1:
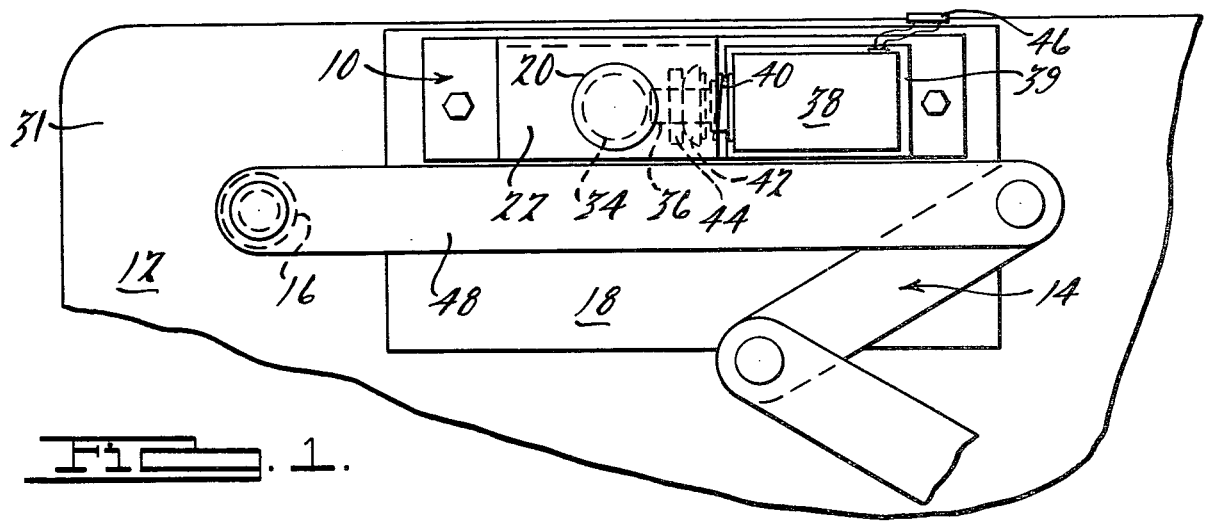
FIG. 1 is a plan view of a portion of a fluid flow measuring device including a shut-off actuating device embodying the invention.
Figure 2:
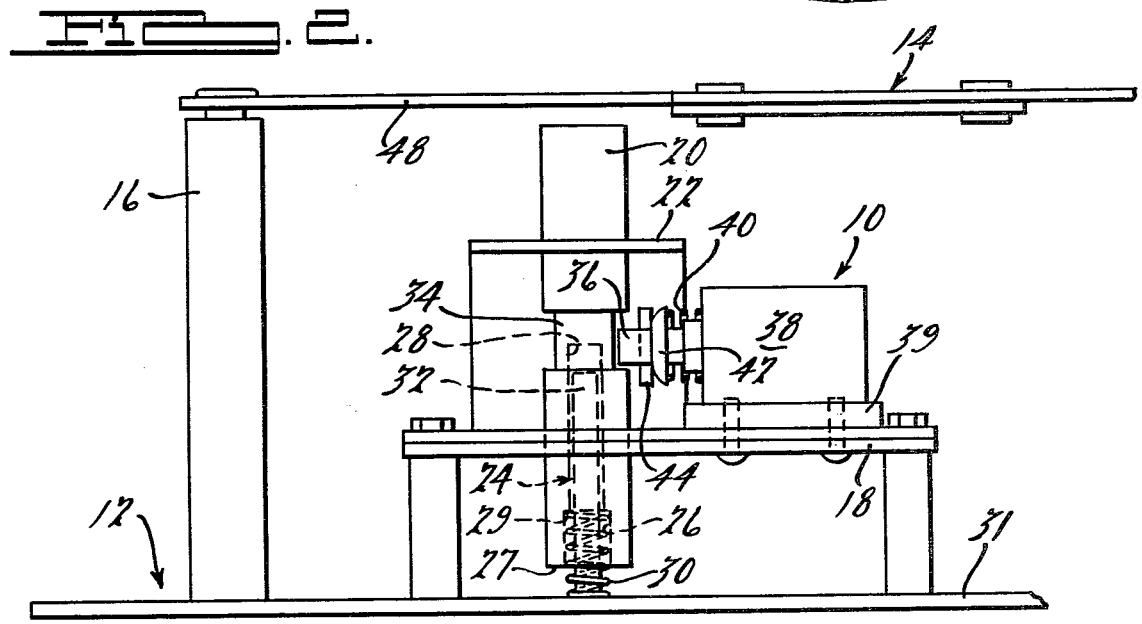
FIG. 2 is an elevation view of the shut-off actuating device of FIG. 1, with its stop member shown in a retracted position.
Figure 3:
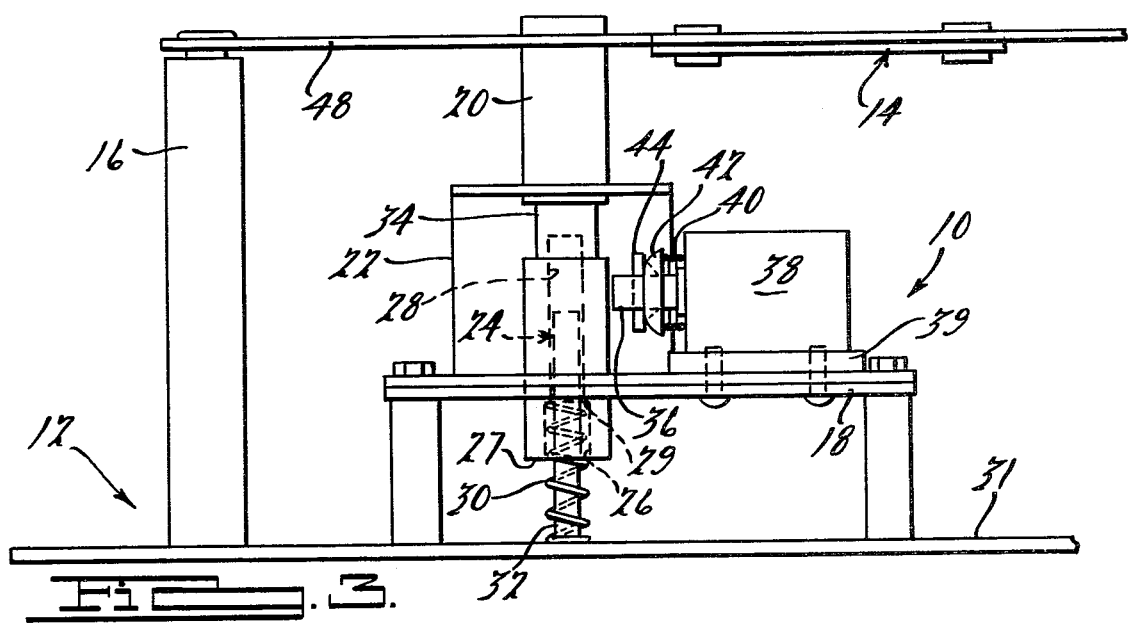
FIG. 3 is an elevation view, similar to that of FIG. 2, showing the shut-off actuating device of FIG. 1, with its stop member shown in an extended position in an interfering relationship with the linkage apparatus of the fluid flow measuring device.

FIGS. 1 through 3 illustrate a shut-off actuating device, indicated generally by reference numeral 10, representing a preferred embodiment of the invention. From the following discussion, one skilled in the art will readily recognize, however, that the preferred shut-off actuating device 10 is shown in the drawings for purposes of illustration only and that the invention is not limited to the particular structure depicted thereby.

The preferred shut-off actuating device 10 is incorporated into a fluid flow measuring device 12, which is shown in FIGS. 1 through 3 with all but the relevant components thereof removed for ease of illustration. The fluid flow measuring device 12 includes a linkage apparatus, indicated generally by reference numeral 14, attached to pivot pin assembly 16. The linkage apparatus 14 pivots about the pivot pin assembly 16 in response to generally linear movement of a fluid flow sensing mechanism (not shown), such as an oscillating bellows-type apparatus for causing said generally linear movement. The linkage apparatus 14 functions to convert the generally linear motion to a rotational or rotary movement in order to rotationally drive an indicating mechanism preferably for providing a read-out of one or more parameters associated with such fluid flow or for operating various control apparatus (not shown). The shut-off actuating device 10 is secured to a stationary plate member 18 fixed to the fluid flow measuring device 12.

The preferred shut-off actuating device 10 includes a stop member 20 slidably received in a bracket assembly 22 for movement in a vertical direction as viewed in FIGS. 2 and 3. The stop member 20 includes a stepped bore 24 extending axially through a portion thereof. The stepped bore 24 includes a first portion 26 extending from an end 27 of the stop member 20 to a second portion 28 of the stepped bore 24. The diameter of the first portion 26 is larger than that of the second portion 28, thereby forming a shoulder 29 therebetween. A biasing spring 30 is received for free movement in compression and extension within the first portion 26 of the stepped bore 24 and is restrained between the shoulder 29 and the base 31 of the fluid flow measuring device 12. A spring guide 32 is slidably received within the biasing spring 30, which is preferably a coiled spring, and extends into the second portion 28 of the stepped bore 24. The spring guide 32 abuts the base 31 of the fluid flow measuring device 12 and is freely slidable relative to the second portion 28 of the stepped bore 24. As the stop member 20 extends or retracts, the spring guide 32 maintains the biasing spring 30 in proper axial alignment with the first portion 26 of the stepped bore 24.

The stop member 20 also preferably includes a discontinuity or recessed portion 34, which is preferably formed in the shape of a groove or notch, extending about its periphery. The recessed portion 34 is abuttingly engaged by a solenoid rod or arm 36 which holds the stop member 20 in its retracted position as shown in FIG. 2. The solenoid rod 36 is activated by a solenoid 38 which is attached to the bracket assembly 22 with solenoid mounting pad 39 therebetween. A solenoid spring 40 co-axially surrounds the solenoid rod 36 and is restrained between the solenoid 38 and a retaining member 42, which is held in place by a retaining pin 44 extending laterally through the solenoid rod 36. The solenoid spring 40 serves to bias the solenoid rod 36 into engagement with the recessed portion 34 of the stop member 20. When the solenoid 38 is activated or energized, the solenoid rod 36 is retracted out of engagement with the recessed portion 34, and the biasing spring 30 causes the stop member 20 to extend to interfere with the linkage apparatus 14 as shown in FIG. 3.

The solenoid 38 is preferably an electric solenoid mechanism and is activated or energized by way of an energizing apparatus or hand-held battery or other power source (not shown), which may be connected to a terminal 46. The preferred terminal 46 comprises a plug-in receptacle for convenient connection to such a hand-held battery or other power source. Although the terminal 46 is shown in the drawings as located on the fluid flow measuring device 12, the terminal 46 may be located outside of the structure being supplied, thereby allowing actuation of the shut-off device without access to such structure. In such an application, the wires connecting the terminal 46 to the solenoid 38 should preferably be protected from tampering or other unauthorized access thereto.

When the shut-off actuating device 10 is to be energized remotely, an indicator light or other indicator device (not shown) may be provided to visually inform the operator that the electrical circuit has been completed. An additional light or other indicator device may also be connected to a limit switch on the stop member 20 of the shut-off actuating device 10 to visually inform the operator that the step member 20 has been fully actuated to stop the flow through the fluid flow measuring device 12. The energizing apparatus may alternatively comprise any of a number of activating or energizing elements or devices known by these skilled in the art suitable for activating the solenoid 38 either at the fluid flow measuring device 12 or, if desired, from a remote location.

The operation of the shut-off actuating device 10 may best be described as follows. When the fluid flow measuring device 12 is operating normally with fluid flowing therethrough, the linkage member 48 of the linkage apparatus 14 pivots with respect to the pivot pin assembly 16 in a plane lying above the shut-off actuating device 10 as viewed in FIGS. 2 and 3. When the solenoid 38 is energized or activated, the solenoid rod 36 is retracted inwardly with respect to solenoid 38 and thereby disengages the recessed portion 34 of the stop member 20. The biasing spring 30 then urges the stop member 20 in a direction, generally perpendicular to the plane of the linkage apparatus 14, to a position wherein the stop member 20 interferes with the continued pivotal motion of the linkage member 48, as shown in FIG. 3. As is mentioned above, the fluid flow measuring device is adapted such that when the linkage apparatus 14 is disabled or rendered inoperative, the fluid may no longer flow through the fluid flow measuring device 12. Thus, when the stop member 20 extends upwardly to block the linkage member 48, the flow through the fluid flow measuring device 12 is interrupted and the fluid supply is thereby shut off.

In the preferred embodiment, the shut-off actuating device 10 may be reset from outside the fluid flow measuring device 12 by urging the stop member 20 back to its non-interfering position (see FIG. 2) by means of an externally activated push rod (not shown). In such a situation the solenoid spring 40 urges the solenoid rod 36 back into engagement with the recessed portion 34 of the stop member 20. The shut-off actuating device 10 is thereby reset for reuse if the need should arise.

The drawings and the above description relate to merely exemplary embodiments of the invention. Changes, variations, and modifications may be made therein without departing from the spirit and scope of the invention as defined in the following claims.

We claim:

1. In a fluid flow device having a flow-sensing apparatus including linkage means operable in response to said fluid flow, said apparatus being adapted to prevent said fluid flow through said device when said linkage means is inoperative, the improvement comprising shut-off means for rendering said linkage means inoperative and actuating means for selectively actuating said shut-off means, thereby preventing said fluid flow through said device, said shut-off means further including a stop member interferingly engageable with said linkage means and biasing means biasing said stop member into said interfering engagement with said linkage means, said actuating means including an actuating arm engageable with said stop member to hold said stop member out of said interfering engagement with said linkage means, said actuating arm being selectively moveable out of said engagement with said stop member, thereby allowing said biasing means to urge said stop member into said interfering engagement with said linkage means.

2. The improvement according to claim 1, wherein said stop member includes a discontinuity thereon, said discontinuity being adapted to be engaged by said actuating arm, said stop member being held out of said interfering engagement with said linkage means when said discontinuity is engaged by said actuating arm.

3. The improvement according to claim 2, wherein said actuating means comprises a solenoid apparatus for selectively urging said actuating arm into and out of engagement with said stop member, said solenoid apparatus including resilient biasing means for urging said actuating arm into said engagement with said stop member, said solenoid apparatus being operative to urge said actuating arm out of said engagement with said stop member when said solenoid apparatus is energized.

4. The improvement according to claim 3, wherein said discontinuity comprises a groove extending around the periphery of said stop member, said stop member being moveable along a first path to interferingly engage said linkage means, said actuating arm being moveable along a second path to engage and disengage said groove, said first path being generally perpendicular to said second path.

5. The improvement according to claim 4, further comprising means for remotely energizing said solenoid.

6. A fluid flow measuring device, comprising means for sensing fluid flow through said device including apparatus moveable in a generally linear manner in response to said fluid flow, at least one linkage member for converting said linear movement to rotary motion, said flow-sensing means being adapted to prevent said fluid flow through said device whenever said linkage member is disabled, a stop member selectively movable into and out of disabling engagement with said linkage member, resilient biasing means for urging said stop member into said disabling engagement with said linkage member, said stop member having a recessed portion thereon, a solenoid apparatus having an armature member resiliently biased into an extended position in engagement with said stop member, said armature member being engageable with said recessed portion to hold said stop member out of said disabling engagement with said linkage member, said armature member being rectractable in response to activation of said solenoid apparatus to disengage said recessed portion, thereby allowing said resilient biasing means to urge said stop member into said disabling engagement with said linkage member, thereby preventing fluid flow through said device.

7. The combination according to claim 6, wherein said stop member includes a bore extending axially from one end of said stop member through a portion thereof, said stepped bore including a first and second coaxial portions, said first portion extending axially between said end of said stop member and said second portion, said first portion having a diameter larger than that of said second portion thereby forming a shoulder therebetween, said resilient biasing means comprising a coiled spring received in said first portion of said bore and being restrained between said shoulder and a stationary portion of said fluid flow measuring device, said coiled spring having a guide member extending axially therethrough, a first end of said guide member being slidably received in said second portion of said bore, a second opposite end of said guide member abutting said stationary portion of said fluid flow measuring device, thereby maintaining said coiled spring in axial alignment with said stop member as said stop member moved into and out of said disabling engagement with said linkage member.

8. The combination according to claim 6 or 7, further comprising means for remotely activating said solenoid apparatus.

9. In a gas meter having inlet and outlet means, said inlet means being connected to a source of gas, conveying means for conveying said gas from said inlet means to said outlet means, and indicator means actuated by said conveying means for providing an indication of a parameter associated with said gas flow through said meter, said conveying means being adapted to prevent gas flow from said inlet means to said outlet means when said conveying means is inoperative, the improvement comprising disabling means for selectively rendering said conveying means inoperative, thereby preventing said gas from flowing through said meter, said conveying means including a bellows apparatus operatively connected to a linkage apparatus pivotally mounted on a pivot member, at least a portion of said bellows apparatus being adapted to move in a generally linear manner in response to gas flow through said meter, said linkage apparatus being adapted to reciprocably pivot in a plane, thereby converting said generally linear motion to rotational motion for driving a flow indication mechanism on said meter, said disabling means comprising a stop member slidably supported by bracket means, said stop member being extendible and in a direction generally perpendicular to said plane between a first position out of interference with said pivoting motion of said linkage apparatus and a second position interfering with said pivoting motion of said linkage apparatus, and solenoid means for selectively actuating said stop member, thereby selectively disabling said conveying means and preventing the flow of gas through said gas flow meter.

10. The improvement according to claim 9, wherein said stop member is biased toward said second position, said solenoid means including a rod member biased toward engagement with said stop member to hold said stop member in said first position, said solenoid rod being retractable out of engagement with said stop member in response to energization of said solenoid apparatus, thereby allowing said stop member to move to said second position.

11. The improvement according to claim 10, further comprising means for remotely energizing said solenoid apparatus.

12. In a gas meter having inlet and outlet means, a bellows apparatus for flowing gas from said inlet means to said outlet means, said bellows apparatus being adapted for generally linear oscillation in response to said gas flow, a linkage assembly operatively connected to said bellows apparatus for pivotal reciprocation in a plane in response to said generally linear oscillation of said bellows apparatus, said linkage assembly drivingly connected to a gas flow indicator mechanism, said operative connection being such that said gas flow is interrupted at least whenever said linkage apparatus is disabled, the improvement comprising a stop member slidably received by a bracket assembly fixed to said gas meter for movement in a direction generally perpendicular to said plane of pivotal reciprocation of said linkage assembly, resilient biasing means for biasing said stop member toward a first position in disabling engagement with said linkage assembly, guide means for maintaining said resilient biasing means in operative biasing engagement with said stop member, said stop member having a discontinuity thereon, a solenoid-actuated rod member biased into engagement with said discontinuity on said stop member to restrain said rod in a second position out of said disabling engagement with said linkage assembly, said rod member being retractible out of engagement with said discontinuity on said stop member in response to actuation of said solenoid, thereby allowing said resilient biasing means to urge said stop member into disabling engagement with said linkage assembly thus interrupting said gas flow.

13. The improvement according to claim 12, further comprising means for remotely actuating said solenoid.

14. In a fluid flow device having a flow-sensing apparatus including linkage means operable in response to said fluid flow, said apparatus being adapted to prevent said fluid flow through said device when said linkage means is inoperative, the improvement comprising shut-off means for rendering said linkage means inoperative and actuating means for selectively actuating said shut-off means, thereby preventing said fluid flow through said device, said actuating means including an actuating member operatively connected with said shut-off means and an activating apparatus for activating said actuating member in order to cause said actuation of said shut-off means, said activating apparatus being remotely located from said fluid flow device, thereby allowing said linkage means to be selectively rendered inoperative without having access to said flow device.

15. The improvement according to claim 14, wherein said shut-off means includes a stop member interferingly engageable with said linkage means and biasing means biasing said stop member toward said interfering engagement with said linkage means, said actuating member being engageable with said stop member to hold said stop member out of said interfering engagement with said linkage means, said actuating member further being selectively moveable by said activating apparatus to be moved out of said engagement with said stop member, thereby allowing said biasing means to urge said stop member into said interfering engagement with said linkage means without having access to said flow device.

16. In a fluid flow device having a flow-sensing apparatus including linkage means operable in response to said fluid flow, said apparatus being adapted to prevent said fluid flow through said device when said linkage means is inoperative, the improvement comprising shut-off means for rendering said linkage means inoperative and actuating means for selectively actuating said shut-off means, thereby preventing said fluid flow through said device, said shut-off means further including a stop member interferingly engageable with said linkage means and biasing means biasing said stop member toward said interfering engagement with said linkage means, said actuating means including an actuating arm engageable with said stop member to hold said stop member out of said interfering engagement with said linkage means, and electrically operable activating apparatus for selectively moving said actuating arm out of said engagement with said stop member, thereby allowing said biasing means to urge said stop member into said interfering engagement with said linkage means.

17. The improvement according to claim 16, wherein said actuating means further comprises an electric solenoid apparatus for selectively urging said actuating arm into and out of engagement with said stop member, said solenoid apparatus including resilient biasing means for urging said actuating arm into said engagement with said stop member, said solenoid apparatus being operative by said activating apparatus to urge said actuating arm out of said engagement with said stop member when said solenoid apparatus is energized, said activating apparatus further including electric current-carrying means electrically connected to said solenoid apparatus, a power source of electric current, and means for electrically connecting said power source to said current-carrying means.

18. The improvement according to claim 16, wherein said actuating means further comprises an electric solenoid apparatus for selectively urging said actuating arm into and out of engagement with said stop member, said solenoid apparatus including resilient biasing means for urging said actuating arm into said engagement with said stop member, said solenoid apparatus being operative by said activating apparatus to urge said actuating arm out of said engagement with said stop member when said solenoid apparatus is energized, said activating apparatus further including means for remotely energizing said solenoid apparatus.

19. In a method for controlling operation of a fluid flow device having a flow-sensing apparatus including linkage means operable in response to said fluid flow and means for preventing said fluid flow through said device when said linkage means is inoperative, the steps which include:
  providing a moveable stop member interferingly engageable with said linkage means;
  providing biasing means for normally biasing said stop member toward said interfering engagement with said linkage means;
  placing an actuating member in engagement with said stop member to hold said stop member out of said interfering engagement with said linkage means; and
  selectively causing said actuating member to move out of said engagement with said stop member, thereby allowing said stop member to move under the influence of said biasing means out of interfering engagement with said linkage means and thereby rendering said linkage means inoperative in order to prevent fluid flow through said device.

20. A method according to claim 19, further comprising providing an electric solenoid apparatus energizable for selectively urging said actuating member out of said engagement with said stop member, and selectively energizing said solenoid apparatus to urge said actuating member out of said engagement with said stop member in order to release said stop member.

21. A method according to claim 20, further comprising energizing said solenoid apparatus from a remote location.

22. A method according to claim 21, wherein said energizing step includes connecting said solenoid apparatus to a remote power source.

23. A method according to claim 21, wherein said energizing step includes connecting said solenoid apparatus to a power source located at said fluid flow device.

* * * * *